United States Patent
Petersen et al.

(10) Patent No.: US 9,924,400 B2
(45) Date of Patent: Mar. 20, 2018

(54) ENHANCED POWER REDUCTION IN MESH NETWORKS

(71) Applicant: TerraNet AB, Lund (SE)

(72) Inventors: Johan Petersen, Malmö (SE); Monthadar Al Jaberi, Malmö (SE)

(73) Assignee: TERRANET AB, Lund (SE)

( * ) Notice: Subject to any disclaimer, the term of this patent is extended or adjusted under 35 U.S.C. 154(b) by 0 days.

(21) Appl. No.: 14/796,054

(22) Filed: Jul. 10, 2015

(65) Prior Publication Data
US 2017/0013494 A1    Jan. 12, 2017

(51) Int. Cl.
*H04W 28/02*    (2009.01)
*H04W 56/00*    (2009.01)
(Continued)

(52) U.S. Cl.
CPC ... *H04W 28/0221* (2013.01); *H04W 52/0212* (2013.01); *H04W 52/0216* (2013.01); *H04W 52/0229* (2013.01); *H04W 56/0015* (2013.01); *H04W 40/005* (2013.01); *H04W 40/244* (2013.01); *H04W 40/246* (2013.01); *H04W 52/0277* (2013.01); *H04W 84/12* (2013.01); *H04W 84/18* (2013.01); *Y02B 60/50* (2013.01)

(58) Field of Classification Search
None
See application file for complete search history.

(56) References Cited

U.S. PATENT DOCUMENTS

| 7,978,717 B2 | 7/2011 | Banks et al. |
| 2009/0010190 A1 | 1/2009 | Gong |

(Continued)

FOREIGN PATENT DOCUMENTS

WO    2014186593 A1    11/2014

OTHER PUBLICATIONS

Camps-Mur, Daniel, et al., "Enabling Always on Service Delivery: Wifi Neighbor Awareness Networking," Apr. 1, 2015, all enclosed pages.

(Continued)

*Primary Examiner* — Jamal Javaid
*Assistant Examiner* — Saad Khawar
(74) *Attorney, Agent, or Firm* — McNair Law Firm, P.A.

(57) ABSTRACT

An arrangement of a mesh network comprising a first station, a second station and one or more intermediate stations is disclosed. The first, second and one or more intermediate stations are configured to comprise a sleep mode wherein the first, second and one or more intermediate stations are idle, and an awake mode wherein the first, second and one or more intermediate stations are awake. The first, second and one or more intermediate stations are further configured to be in the awake mode during a duration of a discovery window—DW—and a mesh management window—MMW—and wherein first, second and one or more intermediate stations are configured to listen for a synchronization beacon during the DW and to transmit and/or listen for zero or more mesh path hybrid wireless mesh protocol—HWMP—frames during the MMW. A method of the arrangement, as well as a first station, an intermediate station, a second station, a method for a first station, a method for an intermediate station and a method for a second station is also disclosed.

13 Claims, 5 Drawing Sheets

(51) Int. Cl.
  *H04W 52/02*   (2009.01)
  *H04W 84/18*   (2009.01)
  *H04W 40/00*   (2009.01)
  *H04W 40/24*   (2009.01)
  *H04W 84/12*   (2009.01)

(56) References Cited

U.S. PATENT DOCUMENTS

| | | | |
|---|---|---|---|
| 2015/0109981 A1 | 4/2015 | Patil et al. | |
| 2015/0382275 A1* | 12/2015 | Pragada | H04W 40/12 370/236 |
| 2016/0014669 A1* | 1/2016 | Patil | H04W 40/246 370/329 |
| 2016/0029403 A1* | 1/2016 | Roy | H04W 72/0406 370/336 |
| 2016/0157089 A1* | 6/2016 | Qi | H04W 76/046 370/254 |

OTHER PUBLICATIONS

"IEEE Standard for Information Technology—Telecommunications and Information Exchange between systems—Local and metropolitan area networks—Specific requirements Part 11: Wireless LAN Medium Access Control (MAC) and Physical Layer (PHY) specifications Amendment 10: Mesh Networking; IEEE Std 802.22s," IEEE Standard of Sep. 10, 2011, all enclosed pages.
International Search Report and Written Opinion of PCT/EP2016/066189 dated Sep. 23, 2016, all enclosed pages.

* cited by examiner

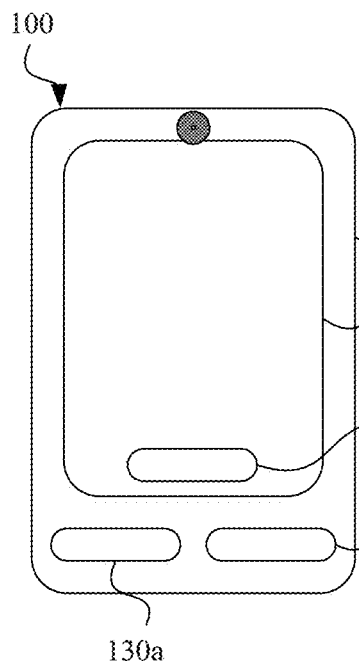
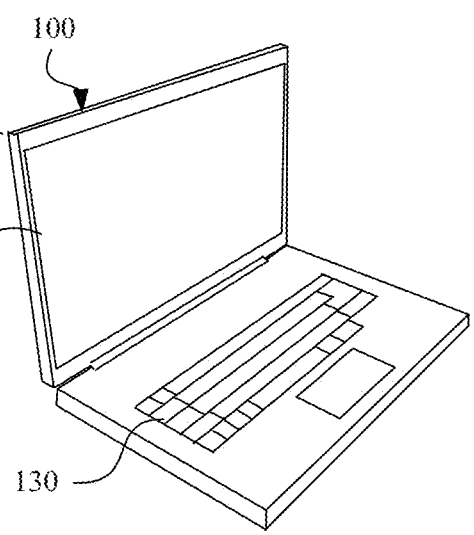
Fig. 1a
Fig. 1b
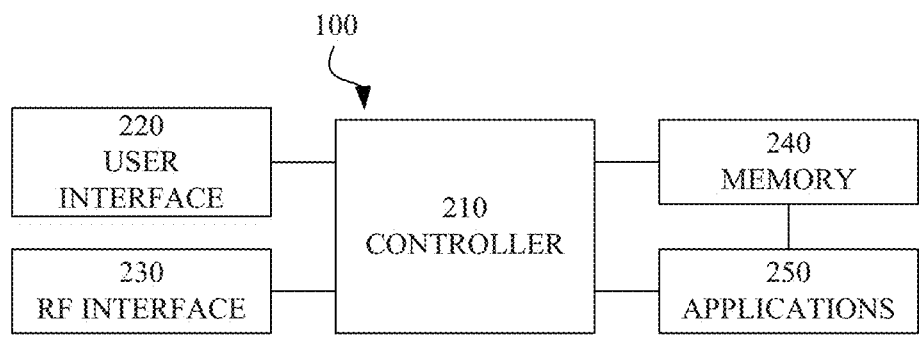
Fig. 2

ENHANCED POWER REDUCTION IN MESH NETWORKS

TECHNICAL AREA

The present invention relates generally to the technical area of mesh networks. More particularly, it relates to reducing power consumption and increase throughput within a mesh network.

BACKGROUND

A mesh network comprises nodes or stations which communicate with each other without the aid of a central control, such as a base station.

The stations themselves keep tracks of neighboring stations, or peers, and the communication between stations may be relayed by multihop through one or more intermediate peers from one station to another.

Mesh networks are created according to the IEEE 802.11 Mesh standard which defines mesh protocols. In order to keep track on neighboring peers and be able to detect new peers entering the network, the stations are configured according to the 802.11 Mesh Protocol to broadcast mesh beacons. Each station may broadcast a mesh beacon at certain periods in order to gain an update of neighbors in the mesh network, The Peer Protocol results in linearly increased power consumption as the mesh network expands with new stations entering the network.

In order to save power within the mesh network, the 802.11 Mesh Power Save Mode dictates that stations may enter sleep mode in an unsynchronized manner in relation to other mesh stations in the network.

However, the Power Save Mode results in an increased latency within the network and, hence, a less efficient mesh network.

Mesh networks also often suffer from congestion and contention since several stations may try to communicate on the same network resources at the same time.

Overall, there is a need for a mesh network with less risk of congestion and contention, better throughput and higher power efficiency.

SUMMARY

It is an object of this disclosure to at least mitigate the problems as described above.

According to a first aspect, this is achieved by an arrangement of a mesh network. The mesh network comprises a first station, a second station and one or more intermediate stations.

The first, second and one or more intermediate stations are configured to comprise a sleep mode wherein the first, second and one or more intermediate stations are idle, and an awake mode wherein the first, second and one or more intermediate stations are awake.

The first, second and one or more intermediate stations are further configured to be in the awake mode during a duration of a discovery window—DW—and a mesh management window—MMW. The first, second and one or more intermediate stations are also configured to listen for a synchronization beacon during the DW and to transmit and/or listen for zero or more mesh path hybrid wireless mesh protocol—HWMP—frames during the MMW.

This arrangement ensures synchronization of all the stations within the mesh network.

In some embodiments, the DW and MMW are transmitted on a predefined channel, e.g. channel 6.

In some embodiments, the first station may be configured to transmit a discovery beacon outside the DW, and to transmit the synchronization beacon to synchronize the one or more intermediate stations and the second station in relation to the first station.

The synchronization beacon synchronizes the stations to be in awake mode during each DW and MMW.

In some embodiments, the first station may be at least one of a NAN master node, NAN non-mast sync node and/or NAN non-master non-sync node.

In some embodiments, the HWMP frames are at least one of a path request—PREQ—frame and/or a path reply—PREP—frame.

In some embodiments, multicast/broadcast data frames and management frames are also transmitted during the MMW.

Because all stations are synchronized to be awake and listen to a certain channel during the MMW, all stations will hear and take part of the HWMP frames, multicast/broadcast data frames and management frames.

In some embodiments, the first station may be further configured to initiate a communication with the second station and the first station, the second station and the one or more intermediate stations may be configured to define a mesh path for the communication.

The mesh path may be used for transmitting data packet from the first station to the second station trough the one or more intermediate stations.

In some embodiments, the first station is further configured to define a quality of service—QoS—class defining a desired level of quality of the communication.

The first station may be configured set a limited number of mesh awake windows—MAW—as available for communication based on the QoS class.

The first station may also be configured to define a MAW map comprising the available MAWs and embed the QoS class with the MAW map in the PREQ frame. The first station is configured to broadcast the PREQ frame comprising the QoS class and the MAW map to the second station during the MMW.

In some embodiments, the QoS class further is configured to define a communication type being at least one of a voice communication, transmission of service data packets, and/or transmission of communication data packets.

In some embodiments, each of the one or more intermediate stations and the second station along the mesh path are configured to receive the PREQ comprising the QoS class and MAW map and indicate in the MAW map which of the available MAWs are available for the communication based on the QoS class.

Each of the one or more intermediate stations and the second station along the mesh path may also be configured to remove congested MAWs from the MAW map.

The second station is further configured to determine which MAWs in the MAW map should be used for the communication based on the indicated available MAWs by defining a final MAW map comprising the MAWs to be used for the communication.

The second station may then be configured to transmit a path reply—PREP—frame comprising the final MAW map to the first station, or the second station may be configured to discard the PREQ frame if it determines that no MAWs should be used for the communication.

In some embodiments, the first station is further configured to receive the PREP frame from the second station. The PREP frame comprises the final MAW map, and the first station is configured to transmit the communication on the available MAWs of the final MAW map along the mesh path.

The first station may also be configured to transmit a new PREQ and a new MAW map if the second station determines that no MAWs should be used for the communication.

In some embodiments, the first station is configured to determine how many data packets pertaining to the communication may be transmitted on each MAW in the MAW map, and wherein data packets that is not transmitted within a first MAW of the MAW map is queued for a second MAW in the MAW map.

A second aspect is a method for a mesh network comprising a first station, a second station and one or more intermediate stations. The method comprises being in a sleep mode wherein the first, second and the one or more intermediate stations are idle and being in an awake mode wherein the first, second and one or more intermediate stations are awake.

The first, second and one or more intermediate stations are in the awake mode during a duration of a discovery window—DW—and a mesh management window—MMW. The method also comprises listening by the first, second and one or more intermediate stations for a synchronization beacon during the DW and transmit and/or listen by the first, second and one or more intermediate for zero or more mesh path hybrid wireless mesh protocol—HWMP—frames during the MMW. The HWMP frames are at least one of a path request—PREQ—frame and/or a path reply—PREP—frame.

In some embodiments, the method further comprises initiating a communication by the first station with the second station of the mesh network, wherein the first station, the second station and the one or more intermediate stations define a mesh path for the communication. Then the method comprises defining by the first station a quality of service—QoS—class indicating a desired level of quality of the communication type and setting by the first station a limited number of mesh awake windows—MAW—as available based on the QoS class.

The method may also comprise defining a MAW map which comprises the available MAWs, embedding by the first station, the QoS class and the MAW map in the PREQ frame and broadcasting, by the first station, the PREQ frame comprising the QoS class and the MAW map to the second station during the MMW.

In some embodiments, each of the one or more intermediate stations and the second station along the mesh path, upon receiving the PREQ, indicates in the MAW map which MAWs are available for the communication based on the QoS class and removes congested MAWs from the MAW map.

In some embodiments, the second station determines which MAWs in the MAW map should be used for the communication based on the indicated available MAWs by defining a final MAW map comprising the MAWs to be used for the communication and transmits a path reply—PREP—frame comprising the final MAW map to the first station. In some embodiments, the second station may discard the PREQ if it is determined that no MAWs should be used for the communication.

In some embodiments, the method further may comprise receiving, by the first station, the PREP frame from the second station, wherein the PREP frame comprises the final MAW map. Then the method comprises transmitting, by the first station, the communication on the available MAWs of the final MAW map along the mesh path. Or, in some embodiments, the method may comprise transmitting, by the first station, a new PREP and a new MAW map if the second station determines that no MAWs of the MAW map should be used for communication.

A third aspect is a network station being a first station of a mesh network comprising a second station and one or more intermediate stations.

The first station is configured to comprise a sleep mode wherein the first station is idle and an awake mode wherein the first station is awake.

The first station is also configured to be in the awake mode during a duration of a discovery window—DW—and a mesh management window—MMW.

The first station is also configured to listen for a synchronization beacon during the DW and transmit and listen for zero or more mesh path hybrid wireless mesh protocol—HWMP—frames during the MMW.

In some embodiments, the first station is configured to initiate communication with the second station of the mesh network, wherein the first station, the second station and the one or more intermediate stations are configured to define a mesh path for communication.

The first station is configured to define a quality of service—QoS—class indicating a desired level of quality of the communication type.

The first station may also be configured to set a limited number of mesh awake windows—MAW—as available based on the QoS class.

The first station may also be configured to define a MAW map comprising the available MAWs.

The first station may be further configured to embed the QoS class and the MAW map in a path request—PREQ—frame and broadcast the PREQ frame comprising the QoS class and the MAW map to the second station during the MMW.

In some embodiments, the first station is further configured to determine how many data packets pertaining to the communication may be transmitted on each MAW in the MAW map, and wherein data packets that is not transmitted within a first MAW of the MAW map is queued for a second MAW in the MAW map.

A fourth aspect is a method of a station being a first station in a mesh network comprising a second station and one or more intermediate stations. The method comprises being in a sleep mode wherein the first station is idle and being in an awake mode wherein the first station is awake. The first station is in the awake mode during a duration of a discovery window—DW—and a mesh management window—MMW. The first station listens for a synchronization beacon during the DW and transmits and/or listens for one or more mesh path hybrid wireless mesh protocol—HWMP—frames during the MMW.

In some embodiments, the method further comprising initiating a communication with the second station of the mesh network by transmitting through the one or more intermediate stations a path request—PREQ—frame to the second station during the MMW. The first station, the second station and the one or more intermediate stations define an mesh path for the communication. The method also comprises defining a quality of service—QoS—class indicating a desired level of quality of the communication, setting by the first station a limited number of mesh awake windows—MAW—as available based on the QoS class and defining a MAW map comprising the available MAWs. Then the method comprises embedding the QoS class and the MAW map in the PREQ frame and broadcasting the at least one PREQ frame comprising the QoS class and the MAW map to the second station during the MMW.

A fight aspect is a network station being an intermediate station of a mesh network comprising a first station and a second station.

The intermediate station is configured to comprise a sleep mode wherein the intermediate station is idle and an awake mode wherein the intermediate station is awake. The intermediate station is configured to be in the awake mode during a duration of a discovery window—DW—and a mesh management window—MMW, and to listen for a synchronization beacon during the DW and transmit and/or listen for one or more mesh path hybrid wireless mesh protocol—HWMP—frames during the MMW.

In some embodiments, the intermediate station is configured to receive a path request—PREQ—frame from the first station in the mesh network to the second station in the mesh network for initiating a communication between the first and second station, wherein the PREQ comprises a limited number of mesh awake windows—MAWs—defining a MAW map and a quality of service—QoS—class indicating a desired level of quality of the communication. The intermediate station may also configured to indicate MAWs available for the communication in the MAW map based on the QoS class and remove congested MAWs from the MAW map and to determine if the MAW map is sufficient for transmitting the communication in relation to the QoS class and forward the PREQ comprising the MAW map to the second station if it is determined that the MAW map is sufficient for transmitting the communication in relation to the QoS class. The intermediate station may also be configured to discard the PREQ if it is determined that the MAW map is not sufficient for transmitting the communication in relation to the QoS class.

A sixth aspect is a method of a station being an intermediate station in a mesh network comprising a first station and a second station. The method comprises being in a sleep mode wherein the intermediate station is idle and an awake mode wherein the intermediate station is awake. The intermediate station is in the awake mode during a duration of a discovery window—DW—and a mesh management window—MMW. The method may also comprise to listen for a synchronization beacon during the DW and transmit and/or listen for one or more mesh path hybrid wireless mesh protocol—HWMP—frames during the MMW.

In some embodiments, the method further comprises receiving a path request—PREQ—frame from the first station in the mesh network to the second station in the mesh network for initiating a communication between the first and the second station. The PREQ comprises a limited number of mesh awake windows—MAWs—defining a MAW map and a quality of service—QoS—class indicating a desired level of quality of the communication. Then the method comprises indicating which of the MAWs in the MAW map that are available for communication based on the QoS class and removing congested MAWs from the MAW map and determining if the MAW map is sufficient for transmitting the communication in relation to the QoS class.

If it is determined that the MAW map is sufficient for transmitting the communication in relation to the QoS class, then the method comprises forwarding the PREQ to the second station.

If it is determined that the MAW map is not sufficient for transmitting the communication in relation to the QoS class, then the method comprises discarding the PREQ.

A seventh aspect is a network station being a second station of a mesh network comprising a first station and one or more intermediate stations.

The second station may be configured to comprise a sleep mode wherein the second station is idle and an awake mode wherein the second station is awake.

The second station is configured to be in the awake mode during a duration of a discovery window—DW—and a mesh management window—MMW.

The second station is configured to listen for a synchronization beacon during the DW and transmit and/or listen for mesh path hybrid wireless mesh protocol—HWMP—frames during the MMW.

In some embodiments, the second station is configured to receive a path request—PREQ—frame from a first station through the one or more intermediate stations in the mesh network, wherein the PREQ comprises a limited number of mesh awake windows—MAWs—defining a MAW map and a quality of service—QoS—class indicating a desired level of quality of the communication.

The second station may be configured to indicate available MAWs in the MAW map based on the QoS class and remove congested MAWs from the MAW map.

The second station may also be configured to determine which MAWs in the MAW map should be used for the communication based on the indicated available MAWs by defining a final MAW map comprising the MAWs to be used for the communication.

The second station may also be configured to transmit a Path reply—PREP—frame comprising the final MAW map through the intermediate station to the first station, or the second station may be configured to discard the PREQ if the second station determines that no MAWs in the MAW map should be used for the communication based on the indicated available MAWs in the MAW map.

An eighth aspect is a method for a network station being a second station of a mesh network comprising a first station and one or more intermediate stations.

The second station is configured to comprise a sleep mode wherein the second station is idle and an awake mode wherein the second station is awake. The method comprises being in the awake mode during a duration of a discovery window—DW—and a mesh management window—MMW, listen for a synchronization beacon during the DW and transmit and/or listen for mesh path hybrid wireless mesh protocol—HWMP—frames during the MMW.

In some embodiments, the method further comprises receiving a path request—PREQ—frame from the first station through the one or more intermediate station in the mesh network, wherein the PREQ comprises a limited number of mesh awake windows—MAWs—defining a MAW map and a quality of service—QoS—class indicating a desired level of quality of the communication.

Then the method may comprise indicating available MAWs in the MAW map based on the QoS class and remove congested MAWs from the MAW map, deciding which MAWs in the MAW map should be used for the communication based on the indicated available MAWs by defining a final MAW map comprising the MAWs to be used for the communication and transmitting a Path reply—PREP—frame comprising the final MAW map through the intermediate station to the first station.

In some embodiments, the method may comprise discarding the PREQ if the second station decides that no MAWs in the MAW map should be used for the communication based on the indicated available MAWs in the MAW map.

BRIEF DESCRIPTION OF THE DRAWINGS

Further objects, features and advantages will appear from the following detailed description of embodiments, with reference being made to the accompanying drawings, in which:

FIG. 1a and FIG. 1b are schematic drawings each illustrating a mesh station according to some embodiments;

FIG. 2 is a schematic drawing illustrating a computer program product according to some embodiments;

DETAILED DESCRIPTION

Figure 3:
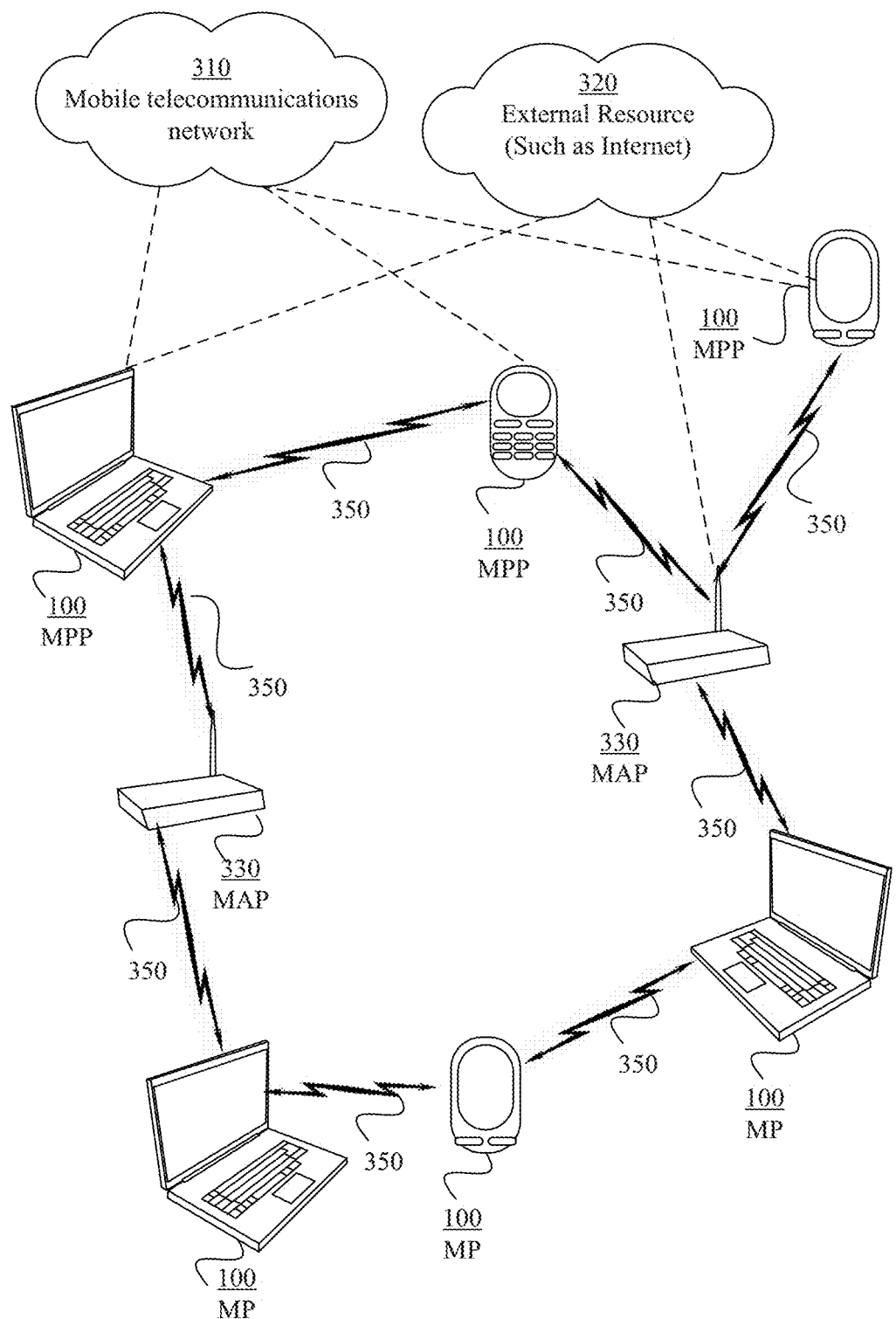
FIG. 3 is a schematic drawing illustrating a mesh network according to some embodiments.

Like numbers refer to like elements throughout.

FIGS. 1a and 1b generally show a station 100 according to an embodiment herein. In one embodiment the station 100 is configured for wireless or radio frequency network communication for acting as a node (or station, the terms may be used interchangeably in this disclosure) in a mesh network. An example of a mesh network will be described with reference to FIG. 3. Examples of such a station 100 are: a personal computer, desktop or laptop, a tablet computer, a mobile telephone, a smart phone and a personal digital assistant.

Two embodiments will be exemplified and described as being a smartphone in FIG. 1a and a laptop computer 100 in FIG. 1b.

Referring to FIG. 1a, a smartphone 100 comprises a housing 110 in which a display 120 is arranged. In one embodiment the display 120 is a touch display. In other embodiments the display 120 is a non-touch display. Furthermore, the smartphone 100 comprises two keys 130a, 130b. In this embodiment there are two keys 130, but any number of keys is possible and depends on the design of the smartphone 100. In one embodiment the smartphone 100 is configured to display and operate a virtual key 135 on the touch display 120. It should be noted that the number of virtual keys 135 are dependant on the design of the smartphone 100 and an application that is executed on the smartphone 100.

Referring to FIG. 1b, a laptop computer 100 comprises a display 120 and a housing 110. The housing comprises a controller or CPU (not shown) and one or more computer-readable storage mediums (not shown), such as storage units and internal memory. Examples of storage units are disk drives or hard drives. The station 100 further comprises at least one data port. Data ports can be wired and/or wireless. Examples of data ports are USB (Universal Serial Bus) ports, Ethernet ports or WiFi (according to IEEE standard 802.11) ports. Data ports are configured to enable a station 100 to connect with other stations or a server.

The station 100 further comprises at least one input unit such as a keyboard 130. Other examples of alternative or additional input units are computer mouse, touch pads, touch screens or joysticks to name a few.

FIG. 2 shows a schematic view of the general structure of a station according to FIGS. 1a and 1b. The station 100 comprises a controller 210 which is responsible for the overall operation of the station 100 and is preferably implemented by any commercially available CPU ("Central Processing Unit"), DSP ("Digital Signal Processor") or any other electronic programmable logic device. The controller 210 may be implemented using instructions that enable hardware functionality, for example, by using executable computer program instructions in a general-purpose or special-purpose processor that may be stored on a computer readable storage medium (disk, memory etc) 240 to be executed by such a processor. The computer readable medium 240 may be loaded with program instructions configured to be carried out and executed by the controller. Such program instructions may for example correspond to the methods described in any of the FIGS. 4, 5, 6, and 7.

The controller 210 is configured to read instructions from the memory 240 and execute these instructions to control the operation of the station 100. The memory 240 may be implemented using any commonly known technology for computer-readable memories such as ROM, RAM, SRAM, DRAM, CMOS, FLASH, DDR, SDRAM or some other memory technology. The memory 240 is used for various purposes by the controller 210, one of them being for storing application data and program instructions 250 for various software modules in the station 100. The software modules include a real-time operating system, drivers for a user interface, an application handler as well as various applications 250. The applications are sets of instructions that when executed by the controller 210 control the operation of the station 100. The applications 250 can include a messaging application such as electronic mail, a browsing application, a media player application, as well as various other applications 250, such as applications for voice calling, video calling, document reading and/or document editing, an instant messaging application, a calendar application, a control panel application, one or more video games, a notepad application, Short Message Service applications, location finding applications, electronic mailing and internet browsing applications.

The station 100 may further comprise a user interface 220, which in the station of FIGS. 1a and 1b is comprised of the display 120 and the keys 130, 135.

The station 100 further comprises a radio frequency interface 230, which is adapted to allow the station to communicate with other devices via a radio frequency band through the use of different radio frequency technologies. Examples of such technologies are IEEE 802.11, IEEE 802.11 Mesh and Bluetooth® to name a few. Other examples of radio technologies for example for communicating with devices outside the mesh network that may be implemented in a station 100 are W-CDMA, GSM, UTRAN, LTE, NMT to name a few.

FIG. 3 shows a mesh network 300. A mesh network 300 comprises a plurality of nodes which may be a station 100 as in FIGS. 1a, 1b and 2. The mesh network 300 may also comprise at least one access point 330, referred to as a Mesh Access Point (MAP). A network without any access points 330 is called an ad hoc network. A MAP 330 is also an example of a network node. In a mesh network 300 each node 330, 100 is configured to capture and disseminate data that is aimed for the specific node. Each node 330, 100 is also configured to serve as a relay for other nodes 100, that is, the node 100 must collaborate to propagate data in the network 300. The mesh access points 330 are configured to serve as relays and routers for the other nodes 100. The nodes 330, 100 are configured to connect to one another through links or connections 350.

The network shown in FIG. 3 is a wireless mesh network and the stations 100 and the access points 330 (if any) are configured to establish the wireless links 350 for communicating with one another.

In this example, the mesh network is arranged to operate according to the IEEE 802.11 Mesh standard. There are three types of nodes 330, 100 in such a mesh network, namely Mesh Points (MP), Mesh Portal Points (MPP) and Mesh Access Points (MAP).

An MP is often a laptop, smartphone or other wireless device, such as has been disclosed in the above with reference to FIGS. 1*a* and 1*b*.

The MPs support a protocol for communicating with other nodes, nodes that are not necessarily neighbors to the MP. In IEEE 802.11 Mesh this protocol is called Hybrid Wireless Mesh Protocol (HWMP). It is hybrid because it supports two kinds of path selection protocols. In IEEE 802.11 Mesh the protocols use the MAC addresses for addressing a data package correctly. Each node 330, 100 is configured to find a path from one node 330, 100 to another node 330, 100. This is referred to as path selection.

An MPP is configured to provide gateway functionality to the mesh network. The MPP may for example be a portal to the internet 320 or a communication network 310, such as a mobile telecommunications network. An MPP must thus be configured to bridge at least two interface protocols. An MPP is often a laptop, a cell phone or other wireless device.

A MAP is an access point that is configured to also communicate according to the mesh network standard and to operate as an access point.

In the mesh network 300 of FIG. 3 there are eight nodes 330, 100 whereof three are laptops, three are smartphones and two are routers. Two nodes are MAPs, three nodes are MPs and at least two nodes are MPPs. It should be noted that a node may have the capability to act as both an MP and an MPP. For example, the MPs of the example mesh network of FIG. 3 may actually also be MPPs. For clarity issues, only three nodes are illustrated as having internet capability and three as having capabilities for mobile telecommunication.

A mesh network can be designed using a flooding technique or a routing technique. When using a routing technique, a message propagates from a sending node 100 to receiving node 100 along a path, by hopping from node 100 to node 100 until the receiving node 100 is reached. To ensure that all paths are available, a routing network must allow for continuous connections and reconfiguration around broken or blocked paths, using self-healing algorithms. According to the standard IEEE 802.11 Mesh should a path be broken this will be discovered after a time period (e.g. 5 s) when a sending node detects that reception is not acknowledged. The system then performs a rerouting procedure by sending out path requests (PREM).

The self-healing capability enables a routing-based network to operate when one node breaks down or a connection goes bad. As a result, the network is typically quite reliable, as there is often more than one path between a source and a destination in the network. Although mostly used in wireless scenarios, this concept is also applicable to wired networks and software interaction.

A wireless mesh network (WMN) is a communications network made up of radio nodes (laptops, cell phones and other wireless devices) while the mesh routers forward traffic to and from the gateways which may but need not connect to the Internet. The coverage area of the radio nodes working as a single network is sometimes called a mesh cloud. Access to this mesh cloud is dependent on the radio nodes working in harmony with each other to create a radio network. A mesh network is reliable and offers redundancy. When one node can no longer operate, the rest of the nodes can still communicate with each other, directly or through one or more intermediate nodes. Wireless mesh networks can be implemented with various wireless technology including 802.11, 802.15, 802.16, cellular technologies or combinations of more than one type.

A wireless mesh network often has a more planned configuration, and may be deployed to provide dynamic and cost effective connectivity over a certain geographic area. An ad-hoc network, on the other hand, is formed ad hoc when wireless devices come within communication range of each other. The MAPs may be mobile, and be moved according to specific demands arising in the network. Often the MAPs are not limited in terms of resources compared to other nodes in the network and thus can be exploited to perform more resource intensive functions. In this way, the wireless mesh network differs from an ad-hoc network, since these nodes are often constrained by resources.

Prior art mesh networks are created according to the Wi-Fi IEEE 802.11 Mesh protocol. The Mesh protocol handles such things as neighbor peering establishment, mesh path selection and data forwarding between different wireless mesh stations. IEEE 802.11 Mesh also defines a power mode that tracks peer mesh station beacons to aid in synchronization and communication.

According to IEEE 802.11 Mesh, every station within the mesh network may broadcast mesh beacons in order to discover new peers and establish peer connections. The power consumption of the mesh network thus increases linearly to the number of peered mesh stations.

In order to reduce power, IEEE 802, 11 Mesh Power Save Mode dictates that stations may enter an idle mode wherein they do not transmit mesh beacons. However, since there is no way to keep track on when the stations within the mesh network are in idle mode or in awake mode, the mesh network may suffer latency problems due to lack of local synchronization between peers.

The inventors have realized after insightful reasoning that the power consumption within a mesh network may be greatly reduced if a new protocol is introduced which enables a discovery window (DW), a mesh management window (MMW) and a plurality of mesh awake windows (MAWs) forming a MAW map while also removing the 802.11 Mesh Peering protocol and 802.11 Mesh Power Save mode from mesh devices. A new Mesh Power Save mode is introduced which follows the local MAW map.

By removing the 802.11 Mesh Peer protocol the mesh stations are no longer enabled to transmit mesh beacons in order to establish peer connections. The stations are also not enabled to become idle in an unsynchronized manner since the 802.11 Mesh Power Save Mode is disabled.

Instead, the new protocol functions as a synchronizing protocol for the stations within the mesh. The protocol configures the stations to be awake and listen to a predetermined channel, e.g. channel 6, during the duration of the DW. In some embodiments, the duration of the DW is 16 TU (Time Units), e.g. 16*1024 µs. During the DW the stations may listen for a discovery beacon which discovers new peers entering the mesh network.

In some embodiments, the DW may be a NAN (neighbor awareness network) discovery window.

The NAN protocol enables neighbor discovery, service discovery and network synchronization. A node in a NAN network may comprise three states, a master state, a non-sync master state, and a non-master non-sync state. A master node (i.e. a node being in the master state) may transmit discovery beacon and a synchronization beacon. A non-master sync node may transmit a synchronization beacon. A non-master non-sync node may only listen for beacons and may not itself transmit the beacons.

The nodes within the NAN may change between the states. It is e.g. likely that a node having several neighbors will transit into the non-master non-sync state as it is likely that there is at least one other master node or at least one other non-master sync node within the vicinity. In the same way, a node having few neighbors may transit into the master state.

A node being in the master state is configured to transmit a discovery beacon for neighbor discovery and a synchronization beacon for network synchronization.

In some embodiments, the stations within the mesh network may be configured to comprise a master state, a slave sync state, and a slave state. The master state enables a station to transmit discovery beacons and synchronization beacons. The slave sync state enables a station to transmit synchronization beacons and disable the station's ability to transmit a discovery beacon. The slave state disables a station's ability to transmit any beacons.

In some embodiments, the stations within the mesh network may be configured to comprise states according to the NAN protocol.

In some embodiments, a first station, e.g. a NAN master node transmits the discovery beacon outside the DW on e.g. channel 6. A vendor specific attribute is encapsulated within the discovery beacon so that any unsynchronized stations may gain knowledge of the existence of the mesh network.

The first station may also transmit a synchronization beacon during the DW. The synchronization beacon synchronizes the timing within the mesh network. This results in that all stations within the network are synchronized in relation to the first station transmitting the synchronization beacon.

A synchronization beacon may also be transmitted by one or more other stations within the network, e.g. one or more NAN non-master sync nodes.

Since not all stations within the mesh network are configured to transmit the synchronization beacon (i.e. unless they are authorized to do so, such as if they transit into a master state, e.g. a NAN master state or a NAN non-master sync state), the average power consumption within the mesh is lowered. The risk of congesting the network due to an abundance of beacons is also lowered.

After the DW, there follows a MMW during which all stations within the mesh network are configured to be awake and listen to a specific channel, e.g. channel 6. The synchronization beacon is in some embodiments used to synchronize the stations within the mesh network so that all stations within the mesh network are awake during the duration of the MMW.

The MMW is used for transmitting HWMP (Hybrid Wireless Mesh Protocol) frames such as PREQ and PREP frames and service frames. The stations are thus configured to at least be awake during the DW and MMW and to transmit HWMP frames during the MMW.

In some embodiments, Multicast/broadcast data frames and management frames are also transmitted during the MMW.

In the Mesh Peering Protocol, information elements (IE) such as supported rates IE, extended rates IE, etc. are used for peering. Since the Mesh Peering Protocol is removed, the IEs are instead incorporated the HWMP management packets such as PREP/PREQ.HWMP (Hybrid Wireless Mesh Protocol) frames such as PREQ and PREP frames and service frames. The stations are thus configured to at least be awake during the DW and MMW and to transmit HWMP frames during the MMW.

In some embodiments, a number of MAWs are embedded within the HWMP frames, where the number of MAWs represent bits available for communication and define a MAW map, or MAW bitmap. In some embodiments, the number of MAWs may be limited by the DW and MMW period cycle. If the Period cycle is 512 TU, and the DW, MMW and each MAW is 16 TU, then the maximum number of MAWs is 30.

The MAW map dictates to a station which MAWs may be used for a communication between the station and one or more other stations.

The discovery window DW, the Mesh Management Window MMW and the Mesh Awake Windows MAWs may be transmitted during a periodic cycle of 512 TU., wherein the DW and MMW comprise 16 TU each and the MAWs may be utilized during the remaining time.

Stations that are not involved in communication with other peers are awake during the DW and the MMW, but may be in idle or sleep mode during the rest of the cycle.

A station that is in idle or sleep mode does not transmit any communication, nor does it listen to any surrounding communication within the network. The station in idle or sleep mode cannot be contacted by other peers until it is awake again.

FIGS. 4, 5, 6 and 7 illustrates a method according to some embodiments of how communication within the mesh may be carried out.

Figure 4:
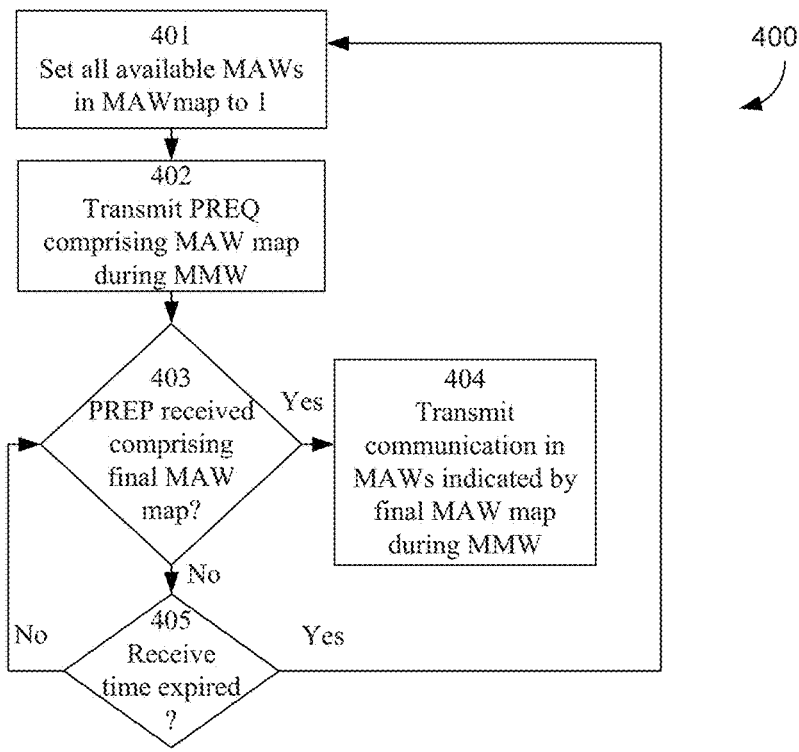
FIG. 4 is a block diagram illustrating a method for a first station according to some embodiments.

In FIG. 4 a first station, e.g. any of the stations 100 described in FIGS. 1, 2, and 3, wishes to communicate with a second station, e.g. any of the stations 100 in FIGS. 1, 2 and 3, within a mesh network, e.g. the mesh network in FIG. 3.

According to the method 400, the first station begins with setting 401 all available MAWs in the MAW map to 1.

The first station may determine which MAWs of the MAW map are available for communication by defining a quality of service (QoS) class comprising a communication type and a desired level of quality of the communication. The communication type may e.g. voice communication, transmission of service data packets, and/or transmission of communication data packets. The desired level of quality may e.g. be that no packets may be dropped, that no more than a ratio of packages is dropped, that all packets should be received in a certain order, or that all packets should be received within a maximum latency, and minimum jitter etc.

Based on the QoS class the first station assesses how many MAWs are needed for the communication and indicates this in the MAW map by setting the available MAWs within the map to 1. If the first station is aware of that one or more of the MAWs of the MAW map are congested, the first station may remove the congested MAWs from the MAW map, thus ensuring that a congested MAW is not encumbered further. A congested MAW may be detected through monitoring actual dataflow, size of queued data, or marking of used MAWs.

When the first station has set all the available MAWs of the MAW map to 1 it embeds the MAW map together with the QoS service class in a PREQ frame addressed to a second station. The second station may e.g. be any of the stations 100 in FIGS. 1, 2, and 3.

The PREQ is then transmitted 402 by broadcast during the MMW. Transmitting the PREQ during the MMW ensures that all neighboring stations within the mesh network will receive it as they are configured to be awake and listen for HWMP and service frames during each MMW.

The PREQ comprising the MAW map is typically transmitted using multihop from the first station to the second station through one or more intermediate stations. Each station receiving the PREQ may indicate in the MAW map which slots are available for communication by removing MAWs from the MAW map that are congested. When the second station receives the PREQ it may determine, based on the QoS class, which MAWs out of the remaining available MAWs that should be used for the communication and indicate this in a final MAW map. The final MAW map is then embedded in a PREP and transmitted back to the first station.

The first station then checks 403 if it has received the PREP frame comprising the final MAW map from the second station.

If the first station has received the PREP comprising the final MAW map ("Yes" path out of 403) it will commence transmission 404 of the communication on the MAWs indicated by the final MAW map to the second station.

If the PREP has not been received ("No" path out of 403) the first station determines 405 if a time period for reception of the PREP has expired.

The time period for reception of the PREP may be dynamically set by the station based on network parameter such as size of the network, amount of network resources, geographical area, mobility parameters etc. The time period for reception of the PREP may in some embodiments be 1 cycle of MMWs, e.g. if the mesh is small with few stations the response time of the second station should be short. In some embodiments, the time period for reception of the PREP is more than 5 cycles, e.g. a larger mesh may require longer response time. However, it is to be understood that other number of cycles are possible.

If the first station determines that the time period for receiving the PREP has expired ("Yes" path out of 405) then the first station may wait 1 or more cycles before restarting the method 400 by setting 401 all available MAWs in the MAW map to 1, and transmit 402 a new PREQ comprising the MAW map during a MMW.

If the first station determines that the time period for receiving the PREP has not expired ("No" path out if 405) then the first station again checks if it has received 403 the PREP comprising the final MAW map.

As elaborated on above, the PREQ frame may hop through one or more intermediate station before reaching the second station.

Figure 5:
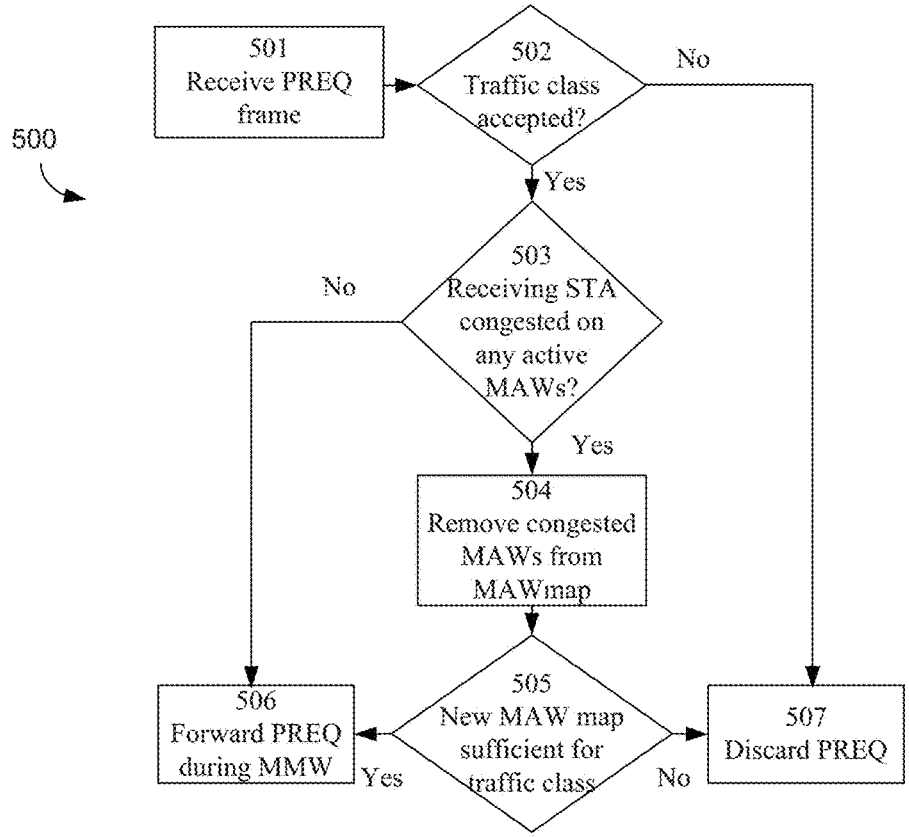
FIG. 5 is a block diagram illustrating a method for an intermediate station according to some embodiments.

FIG. 5 illustrates a method for an intermediate station according to some embodiments.

The method 500 starts with the intermediate station (e.g. any of the stations 100 in FIGS. 1, 2, and 3) receiving 501 a PREQ frame from a first station (e.g. any of the station 100 as in FIGS. 1, 2, and 3 carrying out the method 400 described in FIG. 4) addressed to a second station (e.g. any of the station 100 as described in FIGS. 1, 2 and 3).

The PREQ frame comprises a MAW map indicating available MAWs on which the communication between the first station and the second station may take place and a QoS class defining what type the communication is of and of what level of quality the communication needs to be (compare with method 400 in FIG. 4).

The intermediate station determines 502 if it is able to support the communication type and the desired level of quality by assessing its own resources. E.g. the intermediate station may be involved in too many other communications for it to be able to support a new communication between to first station and the second station, low battery of the mesh station may be another indicator if the intermediate station is able to support the communication or not.

If the intermediate station determines that it cannot support the QoS class ("No" path out of 502) the intermediate station discards 507 the PREQ.

If the intermediate station determines that it can support the QoS class ("Yes" path out of 502) it determines 503 if it congested on any of the available MAWs as indicated by the MAW map.

If the intermediate station determines that there is no congestion on the available MAWs as indicated by the MAW map ("No" path out of 503) the intermediate station forwards 506 the PREQ comprising the unchanged MAW map.

If the intermediate station determines that one or more of the available MAWs are congested ("Yes" path out of 503), the intermediate station removes 504 the congested MAWs from the MAW map, thus defining a new MAW map.

The intermediate station then checks 505 if the new MAW map has a sufficient amount of MAWs to be able to support the communication according to the QoS class.

If the new MAW map does not have a sufficient amount of MAWs to support the QoS class ("No" path out of 505), the intermediate station discards 507 the PREQ.

If the new MAW map has a sufficient amount of MAWs to support communication according to the QoS class ("Yes" path out of 505) the intermediate station forwards 506 the PREQ comprising the new MAW map.

The PREQ is then transmitted forward either to one or more intermediate stations (e.g. any of the stations 100 in FIGS. 1, 2 and 3), which intermediate stations repeats the method 500 until the PREP arrives at the second station.

As elaborated on above, if the intermediate station determines that it cannot support the communication according to the QoS class, it discards the PREQ. Since the PREQ is broadcasted, the likelihood that the PREQ will find its way to the second station through another intermediate station is still high.

If for some reason, e.g. the network is entirely congested, none of the neighboring peers are able to support the communication resulting in that all of them discards the PREQ, then the first station will wait, e.g. during one or more cycle, before broadcasting a new PREQ comprising a MAW map (compare method 400 if FIG. 4).

Figure 6:
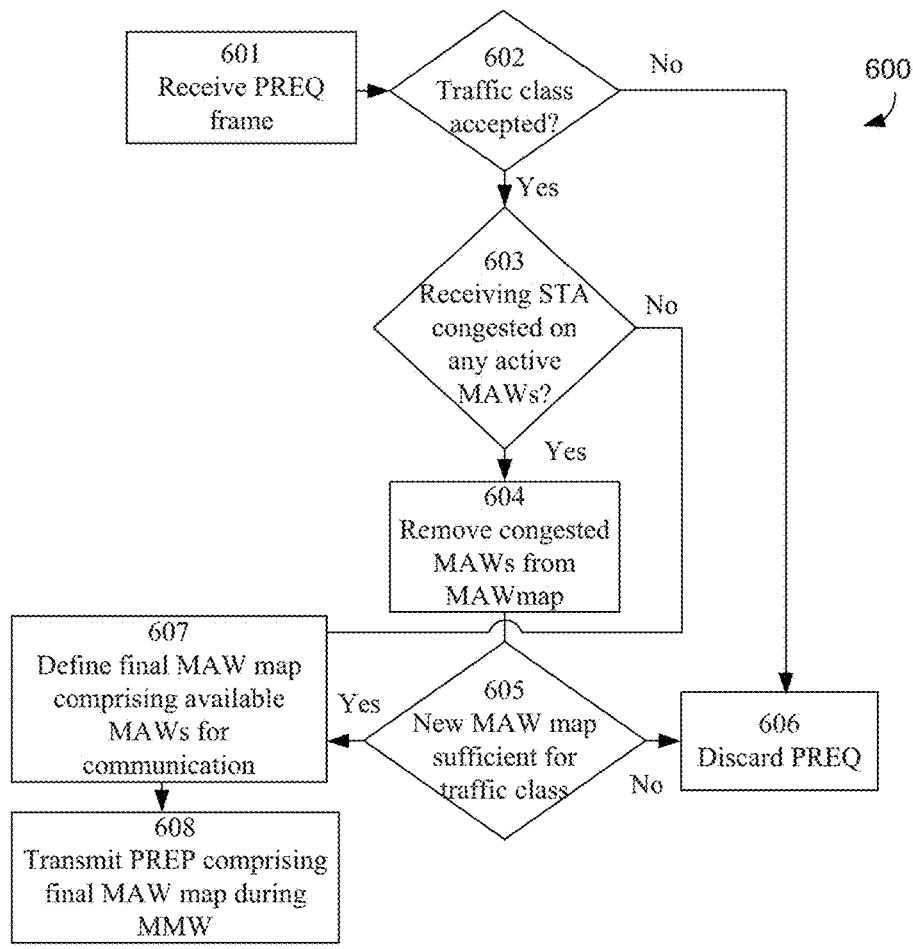
FIG. 6 is a block diagram illustrating a method for a second station according to some embodiments.

FIG. 6 illustrates a method 600 for the second station (e.g. any of the station 100 in FIGS. 1, 2 and 3) according to some embodiments.

The second station receives a PREQ frame from a first station (e.g. the PREQ frame sent by the first station described in the method 400 in FIG. 4, or the PREQ sent by the intermediate station described in the method 500 in FIG. 5) comprising a MAW map and a QoS class (compare with the method 400 and 500).

The second station determines 602 if can support the communication according to the QoS class (e.g. in the same way as described in FIG. 5). If the second station can't support the communication according to the QoS class, e.g.

because of lack of resources, ("No" path out of 602) the second station discards 606 the PREQ.

If the second station determines that it can support the communication according to the QoS class ("Yes" path out of 602) the second station determines (603) if any of the available MAWs as indicated by the MAW map are congested.

If it is determined that one or more of the available MAWs are congested ("Yes" path out of 603) then the second station removes 604 the congested MAWs from the MAW map defining a new MAW map.

The second station then checks 605 if the new MAW map is sufficient for transmitting communication to the first station according to the QoS class. If it is determined that the new MAW map is not sufficient for transmitting communication to the first station according to the QoS class ("No" path out of 605) then the second station discards 606 the PREQ as it cannot support the desired communication.

If it is determined that the new MAW map is sufficient to support the communication to the first station according to the QoS class ("Yes" path out of 605), the second station defines 607 a final MAW map comprising the MAWs that may be used for the communication.

If the second station determines that none of the available MAWs are congested ("No" path out of 603), then the station proceeds with defining 607 a final MAW map comprising the MAWs that may be used for the communication to the first station.

The second station then transmits 608 a PREP comprising the final MAW map to the first station.

As elaborated on above, if the second station determines that it cannot support the communication according to the QoS class, it will discard the PREQ. The first station will detect after a while (compare method 400) that a PREP pertaining to the PREQ has not returned.

The first station may then wait, e.g. during one or more cycles, before broadcasting a new PREQ comprising the MAW map. Since mesh networks are highly dynamic, the chance of the second station being able to accommodate the communication at a slightly later point in time is therefore high.

In some embodiments, mesh paths are defined in the mesh network (e.g. the mesh network in FIG. 3) when a first station has established a connection with a second station through zero or more intermediate stations (the first, second and intermediate stations may e.g. be any of the station as described in conjunction with FIGS. 1, 2, 3, 4, 5 and 6). The mesh path comprises all the stations that are involved in the communication between the first and the second station, i.e. the first station, the second station and the zero or more intermediate stations that are needed to forward the communication from the first station to the second station.

Figure 7:
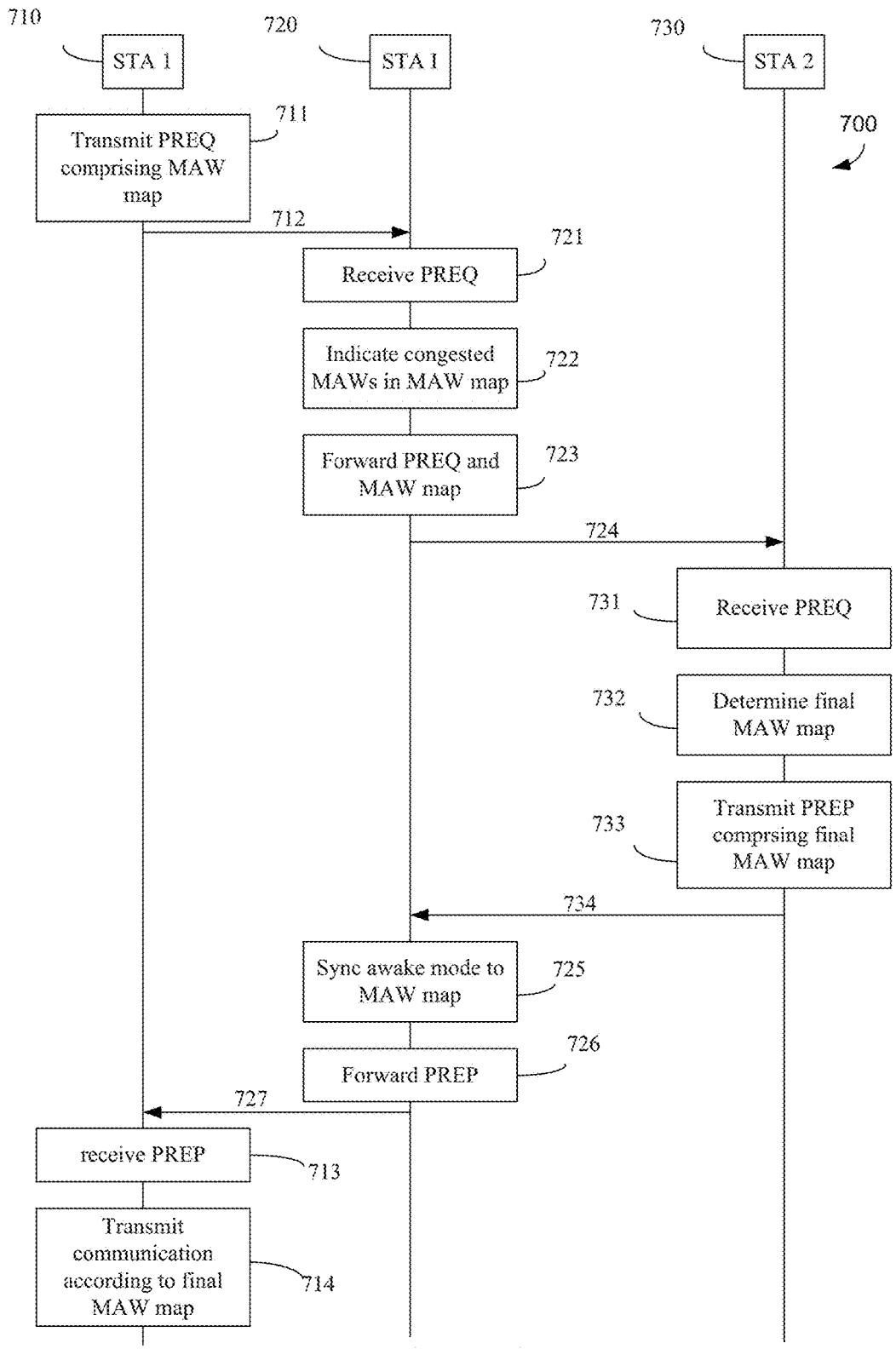
FIG. 7 is a combined signaling and flowchart diagram illustrating a method according to some embodiments.

FIG. 7 illustrates a method 700 according to some embodiments for setting up the active path between a first station (STA 1), an intermediate station (STA 1) and a second station (STA 2). In some embodiments, the first station may e.g. be any of the station 100 as described in FIGS. 1, 2, and 3 and/or the first station as described in FIGS. 4, 5 and 6. In some embodiments, the intermediate station may e.g. be any of the stations 100 as described in FIGS. 1, 2 and 3 and/or the intermediate station as described in FIGS. 5, 4 and 6. In some embodiments, the second station may e.g. be any of the station 100 in FIGS. 1, 2 and 3 and/or the second station as described in FIGS. 6, 4 and 5.

The first station initiates the communication by defining a QoS class (compare with method 400 in FIG. 4) defining a communication type and a desired level of quality of the communication. Then the first station indicates in a MAW map comprising a plurality of MAWs which MAWs are available for communication by setting the available MAWs to 1 and embeds the MAW map and QoS class in a PREQ addressed to the second station.

The first station then broadcasts 711 the PREQ during a MMW. Since all stations within the MESH are configured to be awake during the MMW and listen for HWMP frames such as PREQS and PREPS it is guaranteed that neighboring stations will receive the broadcast.

The intermediate station receives 721 the broadcasted PREQ (through signaling arrow 712 either directly from the first station or from another intermediate station).

The intermediate station determines if it can support the QoS class and removes 721 any congested MAWs from the MAW map (compare method 500 in FIG. 5). If any MAWs are congested they are removed from the MAW map before the PREQ is forwarded 723 to the second station (signaling arrow 724).

The second station receives 731 the PREQ with the MAW map and QoS class and determines 723 a final MAW map based on the appearance of the received MAW map, congested MAWs and the QoS class (compare method 600 in FIG. 6).

The final MAW map is then embedded in a PREP and transmitted 733 back to the first station through the intermediate station (signaling arrow 734).

The intermediate station upon receiving the PREPS checks which MAWs it shall use for the communication between the first and the second station and syncs 725 itself so that is awake during the duration of the communication between the first and the second station. The intermediate station then forwards 726 the PREP to the first station (signaling arrow 727).

The first station receives the PREP 713 and initiates transmission of the communication to the second station using the MAWs according to the final MAW map.

In some embodiments, the method 700 may combined with one or more of the methods 400, 500 and 600.

As elaborated on above, the first station, second station and (zero or more) intermediate station defines a mesh path for their communication transmission. All stations along the mesh path will be synchronized to transit on the same MAWs and thus be awake at the same time. Latency and congestion is decreased within the network since the stations are synchronized to be awake at the same time and since they may avoid using congested MAWs, thus avoiding encumbering them further.

Figure 8:
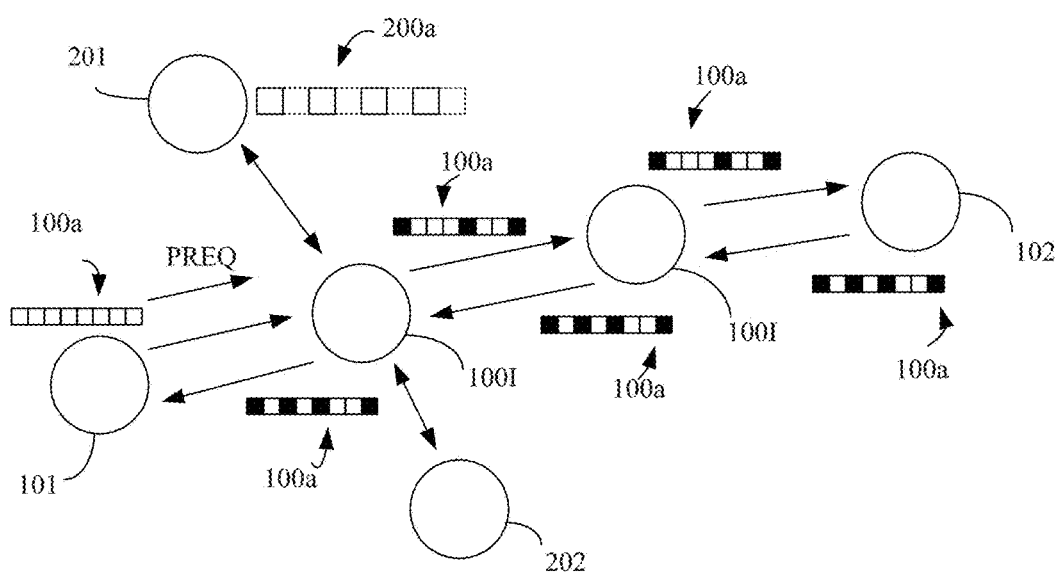
FIG. 8 is a schematic drawing illustrating a mesh network according to some embodiments.

FIG. 8 illustrates a mesh network scenario according to some embodiments.

The stations 101, 100I and 102 define a mesh path on the way to be set up (e.g. by using any of the methods 400, 500, 600 or 700). The stations 201, 100I and 202 define an already mesh path where the station 201 communicates through the station 100I with the station 202.

In some embodiments, the station 101 may e.g. be the stations 100 described in FIGS. 1, 2 and 3 and/or the first station as described in any of the FIGS. 4, 5, 6 and 7.

In some embodiments, the station 100I may be any of the stations 100 in FIGS. 1, 2 and 3 and/or any of the intermediate station in FIGS. 4, 5, 6 and 7.

In some embodiments, the station 102 may be any of the stations 100 in FIGS. 1, 2 and 3 and/or the intermediate station in FIGS. 4, 5, 6 and 7.

In some embodiments, the station 201 may e.g. be the stations 100 described in FIGS. 1, 2 and 3 and/or the first station as described in any of the FIGS. 4, 5, 6 and 7.

In some embodiments, the station 202 may be any of the stations 100 in FIGS. 1, 2 and 3 and/or the intermediate station in FIGS. 4, 5, 6 and 7.

The station 101 broadcasts a PREQ comprising a MAW map 100a indicating available MAWs during a MMW (compare method 400 and 700).

The PREQ is received by the station 100I which is already transmitting communication from the station 201 to the station 202. The station 100I knows that the MAWs in the MAW map 200a pertaining to the communication between the station 201 and the station 202 which are indicated by the dotted edges in FIG. 8 are available for communication. The station 100I may determine that some of the MAWs that are already used by the MAW map 200a may also be used for the communication between the station 101 and 102 and indicates these MAWs as available in the MAW map 100a.

However, the station 100I is also aware of that some of the MAWs in the MAW map 200a are congested, or are on the verge of congestion (compare with method 500 and 700). The station 100I can therefore not use these MAWs in order to forward the communication from the station 101 to the station 102 and indicates this by removing the congested MAWs from the MAW map 100a (as indicated by the dark MAWs in the MAW map 100a).

The station 100I then embeds the altered MAW map in the PREQ again and forwards it by broadcast to the next intermediate station 100I during the MMW.

The next intermediate station 100I is not involved in any other communication and does not experience any congestion on any of the available MAWs of the MAW map and therefore forwards the received PREQ with the MAW map 100a unaltered to the station 102.

The station 102 receives the PREQ comprising the MAW map 100a and determines based on the QoS class which MAWs of the MAW map 100a should be used for the communication. In some embodiments, the station 102 determines that one or more of the MAWs are congested and removes the congested MAWs from the MAW map 100a. The station 102 then determines if the altered MAW map is sufficient for transmitting the communication and if so, determines the appearance of the final MAW map 100a by including the available channels in the MAW map 100a prior to embedding the final MAW map in a PREP frame (compare with methods 600 and 700).

The station 102 then transmits the PREP to the next station 100I which syncs its wakeup pattern to the communication according to the final MAW map prior to transmitting the PREP to the station 100I. The station 100I syncs its wake up pattern to the communication according to the final MAW map. Then the station 100I transmits the PREP to the station 101 which commences transmission of the communication to the station 102 along the now established mesh path through the stations 100I on the MAWs according to the final MAW map 100a In some embodiments, the stations 101, 100I, 102, 201 and 202 may use the methods described in FIGS. 4, 5, 6 and 7 in order to establish and synchronize a mesh path.

In some embodiments, each MAW is designed to be sufficiently long to support end to end communication for a predetermined number of hops, e.g. 16 TU for 6 hops.

This enables a station to estimate how long the communication will be and how many packets may be sent during each MAW to ensure that they reach their destination.

Packets that are not transmitted within a MAW are queued or aggregated for the next upcoming MAW.

This results in that packet aggregation occurs naturally when packets are queued for the upcoming MAW. It also helps throughput within the mesh network since it is ensured that frames will be transmitted on the dedicated available MAWs. And the stations within a mesh path will be aware for how long a certain MAW will be occupied according to the MAW map.

The concept also introduces the life time of the communication into HWMP PREQ/PREP frames. By introducing an extra field in the header of the PREQ/PREP frames which keeps track on the life time of the communication.

The life time of the communication may be dictated by the MAW cycles, and an estimated time for transmission. The remaining life time of communication may be continuously communicated with each HWMP path refresh.

The introduction of the DW, the MMW and the MAWs makes it possible to remove the Mesh beacon for discovering peers, which greatly reduces power consumption within the mesh network. Because of the DW and MMW, all stations are configured to be awake at the same time and to listen to the same channel which ensures that new stations entering the network listen to the same channel and will therefore be found when they are wanted for communication. It also ensures that existing stations and new stations will find peers which they wish to speak to.

The mesh paths also enables that stations only need to keep track on the stations within the mesh path, and not all the other peers. This since stations will be able to reach other peers when needed through the HWMP frames transmitted through the MMW.

The MAWs help mitigate the risk of congestions since the stations may deliberately choose not to transmit on a congested MAW. A station is enabled to pass up a communication it does not have resources to support which in the long run will enhance throughout in the mesh. By rejecting communication when the station determines that it does not have enough resources, or is too congested, the station will not further congest itself. Instead, the communication within the mesh is evenly distributed between stations having enough capacity.

The concept greatly reduces power consumption within the mesh network, mitigates the risk of congestion and decreases latency which increases overall throughput of the mesh network.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. An arrangement of a dynamic mesh network comprising a first station, a second station, and one or more intermediate stations, at least one of the first station, the second station and the one or more intermediate stations being a portable station;
wherein the first, second and one or more intermediate stations are configured to comprise a sleep mode in response to the first, second, and one or more intermediate stations being idle, and comprise an awake mode in response to the first, second, and one or more intermediate stations being awake;
wherein the first, second and one or more intermediate stations are configured to be in the awake mode during a duration of a discovery window (DW) and during a mesh management window (MMW);
wherein the first, second and one or more intermediate stations are configured to listen for a synchronization beacon during the DW and to transmit and/or listen for zero or more mesh path hybrid wireless mesh protocol (HWMP) frames during the MMW;
wherein, during the DW, the first station, the second station, and the one or more intermediate stations are configured to listen for a discovery beacon to discover a further station entering the mesh network;
wherein the HWMP frames comprise a number of mesh awake windows (MAWs), wherein the MAWs represent bits available for communication and define a MAW map;
wherein the first station is configured to transmit a discovery beacon outside the DW, and to transmit the synchronization beacon to synchronize the one or more intermediate stations and the second station in relation to the first station;
wherein the HWMP frames are at least one of a path request (PREQ) frame and/or a path reply (PREP) frame;
wherein the first station is further configured to initiate a communication with the second station;
wherein the first station, the second station and the one or more intermediate stations are configured to define a mesh path for the communication;
wherein the first station is further configured to define a quality of service (QoS) class defining a desired level of quality of the communication;
wherein the first station is configured set a limited number of MAWs as available based on the QoS class;
wherein the first station is configured to define a MAW map comprising the available MAWs and embed the QoS class with the MAW map in the PREQ frame;
wherein the first station is configured to broadcast the PREQ frame comprising the QoS class and the MAW map to the second station during the MMW;
wherein each of the one or more intermediate stations and the second station along the mesh path are configured to receive the PREQ comprising the QoS class and MAW map and indicate in the MAW map which of the available MAWs are available for the communication based on the QoS class;
wherein each of the one or more intermediate stations and the second station along the mesh path are configured to remove congested MAWs from the MAW map;
wherein the second station is further configured to determine which MAWs in the MAW map should be used for the communication based on the indicated available MAWs by defining a final MAW map comprising the MAWs to be used for the communication; and
wherein the second station is configured to transmit a PREP frame comprising the final MAW map to the first station, or wherein the second station is configured to discard the PREQ frame if it determines that no MAWs should be used for the communication.

2. The arrangement according to claim 1, wherein the first station is at least one of a NAN master node, NAN non-master sync node and/or NAN non-master non-sync node.

3. The arrangement according to claim 1, wherein the QoS class further is configured to define a communication type being at least one of a voice communication, transmission of service data packets, and/or transmission of communication data packets.

4. The arrangement according to claim 1, wherein the first station is further configured to:
receive the PREP frame from the second station, wherein the PREP frame comprises the final MAW maps; and
wherein the first station is configured to transmit the communication on the available MAWs of the final MAW map along the mesh path, or transmit a second PREQ and a second MAW map if the second station determines that no MAWs should be used for the communication.

5. The arrangement according to claim 4, wherein the first station is configured to determine how many data packets pertaining to the communication may be transmitted on each MAW in the MAW map, and wherein data packets that are not transmitted within a first MAW of the MAW map are queued for a second MAW in the MAW map.

6. A method for a dynamic mesh network comprising a first station, a second station, and one or more intermediate stations, at least one of the first station, the second station and the one or more intermediate stations being a portable station, wherein the method comprises:
being in a sleep mode in response to the first, second, and the one or more intermediate stations being idle and being in an awake mode in response to the first, second, and one or more intermediate stations being awake, wherein the first, second and one or more intermediate stations are in the awake mode during a duration of a discovery window (DW) and during a mesh management window (MMW);
listening by the first, second and one or more intermediate stations for a synchronization beacon during the DW;
transmitting and/or listening by the first, second and one or more intermediate for zero or more mesh path hybrid wireless mesh protocol (HWMP) frames during the MMW, wherein the HWMP frames are at least one of a path request (PREQ) frame and/or a path reply (PREP) frame and wherein the HWMP frames comprise a number of mesh awake windows (MAWs) wherein the MAWs represent bits available for communication and define a MAW map;
listening during the DW, by the first station, the second station, and the one or more intermediate stations, for a discovery beacon to discover a further station entering the mesh network;
transmitting, by the first station, a discovery beacon outside the DW;
transmitting, by the first station, the synchronization beacon to synchronize the one or more intermediate stations and the second station in relation to the first station;
initiating communication by the first station with the second station of the mesh network, wherein the first station, the second station and the one or more intermediate stations define an mesh path for the communication;
defining by the first station a quality of service (QoS) class defining a desired level of quality of the communication;
setting by the first station a limited number of mesh awake windows (MAWs) as available based on the QoS class;
defining, by the first station, a MAW map comprising the available MAWs;
embedding by the first station the QoS class and the MAW map in the PREQ frame;
broadcasting by the first station the PREQ frame comprising the QoS class and the MAW map to the second station during the MMW;
receiving, by each of the one or more intermediate stations and the second station along the mesh path, the PREQ comprising the QoS class and the MAW map;
indicating on the MAW map which of the available MAWs area available for the communication based one the QoS class;
removing, by each of the one or more intermediate stations and the second station along the mesh path, congested MAWs from the MAW map;
determining, by the second station, which MAWs in the MAW map should be used for the communication based on the indicated available MAWs by defining a final MAW map comprising the MAWs to be used for the communication; and
transmitting, by the second station, the PREP frame comprising a final MAW map to the first station, or discarding the PREQ frame, by the second station, if the second station determines that no MAWs should be used for the communication.

7. A network station being a first station of a dynamic mesh network comprising the first station, a second station, and one or more intermediate stations, wherein at least one of the first station, the second station and the one or more intermediate stations is a portable station;
wherein the first station is configured to comprise a sleep mode in response to the first station being idle and an awake mode in response to the first station being awake;
wherein the first station is configured to be in the awake mode during a duration of a discovery window (DW) and during a mesh management window (MMW);
wherein the first station is configured to listen for a synchronization beacon during the DW and transmit and/or listen for zero or more mesh path hybrid wireless mesh protocol (HWMP) frames during the MMW;
wherein, during the DW, the first station, the second station, and the one or more intermediate stations are configured to listen for a discovery beacon to discover a further station entering the mesh network;
wherein the HWMP frames comprise a number of mesh awake windows (MAWs), wherein the MAWs represent bits available for communication and define a MAW map;
wherein the first station is configured to transmit a discovery beacon outside the DW, and to transmit the synchronization beacon to synchronize the one or more intermediate stations and the second station in relation to the first station;
wherein the HWMP frames are at least one of a path request (PREQ) frame and/or a path reply (PREP) frame;
wherein the first station is further configured to initiate a communication with the second station;
wherein the first station, the second station and the one or more intermediate stations are configured to define a mesh path for the communication;
wherein the first station is further configured to define a quality of service (QoS) class defining a desired level of quality of the communication;
wherein the first station is configured set a limited number of MAWs as available based on the QoS class;
wherein the first station is configured to define a MAW map comprising the available MAWs and embed the QoS class with the MAW map in the PREQ frame;
wherein the first station is configured to broadcast the PREQ frame comprising the QoS class and the MAW map to the second station during the MMW;
wherein each of the one or more intermediate stations and the second station along the mesh path are configured to receive the PREQ comprising the QoS class and MAW map and indicate in the MAW map which of the available MAWs are available for the communication based on the QoS class;
wherein each of the one or more intermediate stations and the second station along the mesh path are configured to remove congested MAWs from the MAW map;
wherein the second station is further configured to determine which MAWs in the MAW map should be used for the communication based on the indicated available MAWs by defining a final MAW map comprising the MAWs to be used for the communication; and
wherein the second station is configured to transmit a PREP frame comprising the final MAW map to the first station, or wherein the second station is configured to discard the PREQ frame if it determines that no MAWs should be used for the communication.

8. The first station according to claim 7, wherein the first station is further configured to determine how many data packets pertaining to the communication may be transmitted on each MAW in the MAW map, and wherein data packets that are not transmitted within a first MAW of the MAW map are queued for a second MAW in the MAW map.

9. Method of a station being a first station in a dynamic mesh network comprising the first station, a second station, and one or more intermediate stations, wherein at least one of the first station, the second station and the one or more intermediate stations is a portable station, wherein the method comprises:
being in a sleep mode in response to the first station being idle and being in an awake mode in response to the first station being awake, wherein the first station is in the awake mode during a duration of a discovery window (DW) and a mesh management window (MMW);
listening for a synchronization beacon during the DW;
transmitting and/or listening for one or more mesh path hybrid wireless mesh protocol (HWMP) frames during the MMW, wherein the HWMP frames are at least one of a path request (PREQ) frame and/or a path reply (PREP) frame and wherein the HWMP frames comprise a number of mesh awake windows (MAWs) wherein the MAWs represent bits available for communication and define a MAW map;
listening during the DW, by the first station, the second station, and the one or more intermediate stations, for a discovery beacon to discover a further station entering the mesh network;

transmitting a discovery beacon outside the DW;
transmitting the synchronization beacon to synchronize the one or more intermediate stations and the second station in relation to the first station;
initiating a communication with the second station of the mesh network by transmitting through the one or more intermediate stations a PREQ frame to the second station during the MMW, wherein the first station, the second station and the one or more intermediate stations define an mesh path for the communication;
defining a quality of service QoS class defining a desired level of quality of the communication;
setting by the first station a limited number of MAWs as available based on the QoS class;
defining a MAW map comprising the available MAWs;
embedding the QoS class and the MAW map in the PREQ frame;
broadcasting the at least one PREQ frame comprising the QoS class and the MAW map to the second station during the MMW;
wherein each of the one or more intermediate stations and the second station along the mesh path receive the PREQ comprising the QoS class and the MAW map;
indicating on the MAW map which of the available MAWs area available for the communication based one the QoS class;
wherein each of the one or more intermediate stations and the second station along the mesh path remove congested MAWs from the MAW map;
wherein the second station determines which MAWs in the MAW map should be used for the communication based on the indicated available MAWs by defining a final MAW map comprising the MAWs to be used for the communication; and
wherein the second station transmits the PREP frame comprising a final MAW map to the first station, or discards the PREQ frame if the second station determines that no MAWs should be used for the communication.

10. A network station being an intermediate station of a dynamic mesh network comprising a first station, a second station, and the intermediate station, at least one of the first station, the second station, and the intermediate station being a portable station;
wherein the intermediate station is configured to comprise a sleep mode in response to the intermediate station being idle and an awake mode in response to the intermediate station being awake;
wherein the intermediate station is configured to be in the awake mode during a duration of a discovery window (DW) and during a mesh management window (MMW);
wherein the intermediate station is configured to listen for a synchronization beacon during the DW and transmit and/or listen for one or more mesh path hybrid wireless mesh protocol (HWMP) frames during the MMW;
wherein, during the DW, the intermediate station is configured to listen for a discovery beacon to discover a further station entering the mesh network;
wherein the HWMP frames comprise a number of mesh awake windows (MAWs), wherein the MAWs represent bits available for communication and define a MAW map;
wherein the intermediate station is configured to receive a discovery beacon outside the DW from the first station, and receive the synchronization beacon to synchronize the intermediate station in relation to the first station;
wherein the HWMP frames are at least one of a path request (PREQ) frame and/or a path reply (PREP) frame;
wherein the first station is further configured to initiate a communication with the second station;
wherein the first station, the second station and the intermediate station are configured to define a mesh path for the communication;
wherein the first station is further configured to define a quality of service (QoS) class defining a desired level of quality of the communication;
wherein the first station is configured set a limited number of MAWs as available based on the QoS class;
wherein the first station is configured to define a MAW map comprising the available MAWs and embed the QoS class with the MAW map in the PREQ frame;
wherein the first station is configured to broadcast the PREQ frame comprising the QoS class and the MAW map to the second station during the MMW;
wherein the intermediate station along the mesh path is configured to receive the PREQ comprising the QoS class and MAW map and indicate in the MAW map which of the available MAWs are available for the communication based on the QoS class;
wherein the intermediate station along the mesh path is configured to remove congested MAWs from the MAW map;
wherein the second station is further configured to determine which MAWs in the MAW map should be used for the communication based on the indicated available MAWs by defining a final MAW map comprising the MAWs to be used for the communication; and
wherein the second station is configured to transmit a PREP frame comprising the final MAW map to the first station, or wherein the second station is configured to discard the PREQ frame if it determines that no MAWs should be used for the communication.

11. Method of a station being an intermediate station in a dynamic mesh network comprising a first station, a second station, and the intermediate station, wherein at least one of the first station, the second station and the one or more intermediate stations is a portable station, wherein the method comprises:
being in a sleep mode in response to the intermediate station being idle and an awake mode in response to the intermediate station being awake;
wherein the intermediate station is in the awake mode during a duration of a discovery window (DW) and a mesh management window (MMW);
listening for a synchronization beacon during the DW;
transmitting and/or listening for one or more mesh path hybrid wireless mesh protocol (HWMP) frames during the MMW, wherein the HWMP frames are at least one of a path request (PREQ) frame and/or a path reply (PREP) frame and wherein the HWMP frames comprise a number of mesh awake windows (MAWs) wherein the MAWs represent bits available for communication and define a MAW map;
listening during the DW, by the intermediate station, for a discovery beacon to discover a further station entering the mesh network;

receiving, from the first station, a discovery beacon outside the DW and a synchronization beacon to synchronize the intermediate station in relation to the first station;

receiving a PREQ frame from the first station in the mesh network to the second station in the mesh network for initiating a communication between the first and the second station, wherein the PREQ comprises a limited number of MAWs defining a MAW map and a quality of service QoS class indicating a desired level of quality of the communication;

indicating which of the MAWs in the MAW map that are available for communication based on the QoS class and removing congested MAWs from the MAW map;

determining if the MAW map is sufficient for transmitting the communication in relation to the QoS class; and if it is determined that the MAW map is sufficient for transmitting the communication in relation to the QoS class:

forwarding the PREQ to the second station;

and if it is determined that the MAW map is not sufficient for transmitting the communication in relation to the QoS class:

discarding the PREQ.

12. A network station being a second station of a dynamic mesh network comprising a first station, the second station, and one or more intermediate stations, at least one of the first station, the second station, and the intermediate station being a portable station;

wherein the second station is configured to comprise a sleep mode in response to the second station being idle and an awake mode in response to the second station being awake;

wherein the second station is configured to be in the awake mode during a duration of a discovery window (DW) and a mesh management window (MMW);

wherein the second station is configured to listen for a synchronization beacon during the DW and transmit and/or listen for mesh path hybrid wireless mesh protocol (HWMP) frames during the MMW;

wherein, during the DW, the second station is configured to listen for a discovery beacon to discover a further station entering the mesh network;

wherein the HWMP frames comprise a number of mesh awake windows (MAWs), wherein the MAWs represent bits available for communication and define a MAW map;

wherein the intermediate station is configured to receive a discovery beacon outside the DW from the first station, and receive the synchronization beacon to synchronize the intermediate station in relation to the first station;

wherein the HWMP frames are at least one of a path request (PREQ) frame and/or a path reply (PREP) frame;

wherein the first station is further configured to initiate a communication with the second station;

wherein the first station, the second station and the one or more intermediate stations are configured to define a mesh path for the communication;

wherein the first station is further configured to define a quality of service (QoS) class defining a desired level of quality of the communication;

wherein the first station is configured set a limited number of MAWs as available based on the QoS class;

wherein the first station is configured to define a MAW map comprising the available MAWs and embed the QoS class with the MAW map in the PREQ frame;

wherein the first station is configured to broadcast the PREQ frame comprising the QoS class and the MAW map to the second station during the MMW; wherein each of the one or more intermediate stations and the second station along the mesh path are configured to receive the PREQ comprising the QoS class and MAW map and indicate in the MAW map which of the available MAWs are available for the communication based on the QoS class;

wherein each of the one or more intermediate stations and the second station along the mesh path are configured to remove congested MAWs from the MAW map;

wherein the second station is further configured to determine which MAWs in the MAW map should be used for the communication based on the indicated available MAWs by defining a final MAW map comprising the MAWs to be used for the communication; and wherein the second station is configured to transmit a PREP frame comprising the final MAW map to the first station, or wherein the second station is configured to discard the PREQ frame if it determines that no MAWs should be used for the communication.

13. A method for a network station being a second station of a dynamic mesh network comprising a first station, the second station, and one or more intermediate stations, wherein the method comprises:

being in a sleep mode in response to the second station being idle and an awake mode in response to the second station being awake;

wherein the second station is in the awake mode during a duration of a discovery window (DW) and a mesh management window (MMW);

listening for a synchronization beacon during the DW;

transmitting and/or listening for mesh path hybrid wireless mesh protocol (HWMP) frames during the MMW, wherein the HWMP frames are at least one of a path request (PREQ) frame and/or a path reply (PREP) frame and wherein the HWMP frames comprise a number of mesh awake windows (MAWs) wherein the MAWs represent bits available for communication and define a MAW map;

listening during the DW, by the second station, for a discovery beacon to discover a further station entering the mesh network;

receiving, from the first station, a discovery beacon outside the DW and a synchronization beacon to synchronize the intermediate station in relation to the first station;

receiving a PREQ frame from the first station through the one or more intermediate station in the mesh network, wherein the PREQ comprises a limited number of MAWs defining a MAW map and a quality of service (QoS) class indicating a desired level of quality of the communication;

indicating available MAWs in the MAW map based on the QoS class and remove congested MAWs from the MAW map;

deciding which MAWs in the MAW map should be used for the communication based on the indicated available MAWs by defining a final MAW map comprising the MAWs to be used for the communication; and transmitting a PREP frame comprising the final MAW map through the intermediate station to the first station, or discarding the PREQ if the second station decides that no MAWs in the MAW map should be used for the communication based on the indicated available MAWs in the MAW map.

\* \* \* \* \*